(12) United States Patent
Niwa

(10) Patent No.: US 6,876,505 B2
(45) Date of Patent: Apr. 5, 2005

(54) MANUFACTURING METHOD OF COLOR WHEEL, AND COLOR WHEEL FABRICATED THEREBY AND INCORPORATED IN COLOR WHEEL ASSEMBLY AND IMAGE DISPLAY APPARATUS

(75) Inventor: Shinichi Niwa, Iwata-gun (JP)

(73) Assignee: Minebea Co., Ltd., Nagano (JP)

( * ) Notice: Subject to any disclaimer, the term of this patent is extended or adjusted under 35 U.S.C. 154(b) by 0 days.

(21) Appl. No.: 10/851,186

(22) Filed: May 24, 2004

(65) Prior Publication Data

US 2004/0246449 A1 Dec. 9, 2004

(30) Foreign Application Priority Data

Jun. 6, 2003 (JP) ........................................ 2003-162473

(51) Int. Cl.⁷ ................................................ G02B 5/22
(52) U.S. Cl. ........................ 359/891; 359/885; 348/743; 356/418; 362/293
(58) Field of Search .................................. 359/885, 888, 359/891; 345/589; 348/743; 356/418; 362/293

(56) References Cited

U.S. PATENT DOCUMENTS

2003/0142241 A1 * 7/2003 Allen et al. .................. 348/742

FOREIGN PATENT DOCUMENTS

WO        WO 94/25796    * 11/1994

* cited by examiner

*Primary Examiner*—Leo Boutsikaris
(74) *Attorney, Agent, or Firm*—Oliff & Berridge, PLC

(57) ABSTRACT

A color wheel is fabricated with filter sectors formed on both surfaces of a substrate such that filter sectors adjacent to each other are disposed respectively on the top and bottom side surfaces of the substrate, whereby structures as means for demarcating each of the filter sectors can be shaped on the substrate at one time so that the adjacent filter sectors can be positioned with respect to each other with an accuracy of the demarcation of the structures without positioning masking jigs every time each filter is formed.

11 Claims, 15 Drawing Sheets

MANUFACTURING METHOD OF COLOR WHEEL, AND COLOR WHEEL FABRICATED THEREBY AND INCORPORATED IN COLOR WHEEL ASSEMBLY AND IMAGE DISPLAY APPARATUS

BACKGROUND OF THE INVENTION

1. Field of the Invention

The present invention relates to a manufacturing method of a color wheel suitable for use as a filter element of a time-share light dispersing device, and to a color wheel fabricated by the manufacturing method and incorporated in a color wheel assembly making up a projection-type image display apparatus.

2. Description of the Related Art

Color composition in a projection-type image display apparatus has conventionally been accomplished commonly by a method, such as: a single-panel method, in which one light valve element adapted to control light amount per pixel thereby creating an image is used to disperse each pixel into red (R), green (G), and blue (B) lights; and a three-panel method, in which three light valve elements dedicated to R, G and B lights are used to produce in parallel R, G and B images, and then the three images thus produced are composed. Recently, as a light valve element capable of fast switching, such as a ferroelectric liquid crystal display element or a digital micro mirror device, is increasingly coming into practical use, a time-sharing single-panel method is widely used. In the time-sharing single-panel method, R, G and B lights are caused to sequentially impinge on one light valve element, the light valve element is driven in synchronization with switching-over of the R, G and B lights thereby producing R, G and B images in a time-series manner, and the images thus produced are projected onto a screen, or the like. Here, color composition of the images is accomplished by a viewer due to an afterimage effect occurring at a sense of vision. In the time-sharing single-panel method, reduction in both dimension and weight of the apparatus, which is a feature of a single-panel method, can be achieved by employing a relatively simple optical system, and therefore the time-sharing single-panel method is favorable for realizing inexpensive fabrication of a projection-type image display apparatus. In such an image display apparatus, a color wheel is preferably used as a filter element of a time-share light dispersing device to sequentially disperse light emitted from a white light source into R, G and B lights having respective wavelength bands in a time-sharing manner (refer to, for example, Japanese Patent Application Laid-Open No. H06-347639).

FIGS. 10A and 10B are respectively front and side views of a typical color wheel assembly incorporating such a color wheel. Referring to FIG. 10B, a color wheel assembly 200 comprises a color wheel 100, a hub 105, and a motor 106. The color wheel 100 is a tricolor color wheel composed of a disk-like substrate 101 which is made of a light-transmitting material, for example, optical glass, and three filter sectors 102, 103 and 104 which are formed on a surface of the substrate 101, and which transmit exclusively, for example, R, G and B lights, respectively. The color wheel 100 thus structured is fixedly attached to the motor 106 via the hub 105 coaxially therewith. The color wheel assembly 200 operates such that the color wheel 100 is rotated by the motor 106 so that the filter sectors (R, G and B) 102, 103 and 104 sequentially have white light S falling incident thereon whereby the white light S is sequentially dispersed into R, G and B lights.

Another known method of the time-sharing color composition as described above is that, for example, Y (yellow) light which results from white light having only B light extinguished, and M (magenta) light which results from white light having only G light extinguished are sequentially dispersed by an optical system respectively into R and G lights, and into R and B lights, then the R and G lights are modulated into R and G images in parallel to be composed into a Y image while the R and B lights are modulated into R and B images in parallel to be composed into an M image, and the Y image and the M image are sequentially projected on a screen, or the like. Though two light valve elements, one for R light and the other for G and B lights, are required in this method, R light emitted from a white light source can be fully utilized thereby improving the brightness on the display. In this method, a color wheel assembly employs a color wheel which includes two kinds/colors of filter sectors to filter the Y and M colors, respectively.

Such a bicolor color wheel is shown in FIGS. 11A and 11B, which show its plan view and its cross-sectional view taken along a line A–A'. A color wheel 110 shown in FIGS. 11A and 11B is structured such that a disk-like substrate 111, which is made of a light-transmitting material, for example, optical glass, has two kinds of filter sectors 112 and 113 formed thereon, and such that, for example, each filter sector 112 is a Y transmitting filter to reflect R light only and to transmit other lights, and each filter sector 113 is an M transmitting filter to transmit B light only and to transmit other lights. In the remaining part of the description of the related art, a bicolor color wheel is exemplified, but the present invention is not limited thereto as win be known from the descriptions to follow later on.

The filter sectors 102 and 103 are usually constituted by an optical interference filter that is formed of a dielectric multi-layer film structured such that a dielectric thin film formed of a material having a high refractive index (e.g., $TiO_2$, $ZrO_2$, and ZnS), and a dielectric thin film formed of a material having a low refractive index (e.g., $SiO_2$, and $MgF_2$) are alternately laminated by an evaporation method, a sputtering method, or the like. The optical interference filter is superior in durability (heat resistance, light stability, and chemical resistance) to a color filter formed by a staining method, a pigment dispersion method, or the like, has a high transmittance, and readily achieves a sharp spectroscopic characteristic, and therefore endures exposure to intensive light flux and produces a display image of a high visual quality.

Filter sectors, which are formed of the aforementioned dielectric multi-layer film, are often demarcated by means of a masking jig of a metallic thin plate (hereinafter referred to as "metal mask"). A method of forming the filter sectors accomplished by using metal masks are explained in FIGS. 12A to 12D, in each of which a plan view of the bicolor color wheel 110 under fabrication is shown on the left, and a cross-sectional view thereof taken along a line A–A' is shown on the right. FIG. 12A shows the color wheel 110 at a process, where a metal mask 210 having openings 212 corresponding to the filter sectors 112 is duly positioned and fixedly set on one side surface of the substrate 111, FIG. 12B shows the color wheel 110 at a process, where the filter sectors 112 are formed by an evaporation method, a sputtering method, or the like, FIG. 12C shows the color wheel 110 at a process, where a metal mask 220 having openings 213 corresponding to the filter sectors 113 is duly positioned and fixedly set on the one side of the substrate 111, and FIG. 12D shows the color wheel at a process, where the filter sectors 113 are formed by an evaporation method, a sputtering method, or the like. The method using metal masks is more cost-effective and environmentally-friendly than, for example, a photolithographic method, or the like.

Different kinds of filter sectors corresponding to different colors and adjacent to each other are required to abut each other precisely and tightly unless achromatic areas which do not constitute any filter sectors are intentionally disposed. This is because if the adjacent filter sectors do not abut each other precisely and tightly, a gap is generated between the adjacent filter sectors, and light passing the gap fails to definitely determine its color thus resulting in not fully contributing to forming an image. Accordingly, in the above-described method of forming the filter sectors, it is crucial to precisely position and set, on the substrate 111 where the filter sectors 112 are already formed, the metal mask 220 for forming the filter sectors 113. To this end, at the aforementioned process shown in FIG. 12C, the metal mask 220 is first guided mechanically, for example, with a positioning pin, and then finally lined up by viewing, for example, through a microscope, the peripheries of the filter sectors 112 already formed and sidewalls W' defining the opening 213 of the metal mask 220.

However, the following problem is found in the positioning technique described above. Since s metal mask usually has a thickness of about 100 μm, it occasionally happens at the process of forming the filter sectors 112 that as shown in FIG. 12B, dielectric multi-layer films constituting the filter sectors 112 fail to achieve a predetermined thickness at regions D which extend along sidewalls W defining the openings 212 of the metal mask 210, and which measure several 10 to 100 μm in width. In such a case, the color of the film changes continuously at the regions D to become achromatic making it difficult to clearly determine the demarcation of the filter sectors 112 even by viewing through a microscope, and this hinders precise alignment of the sidewalls of the openings 212 to the filter sectors 112. Consequently, the filter sectors 112 and the filter sectors 113 are positioned with respect to each other with a lowered degree of accuracy, and incomplete filter portions C are inevitably found at boundaries B between the filter sectors 112 and the filter sectors 113 (refer back to FIG. 11B).

In order to overcome the problem, for example, Japanese Patent Application Laid-Open No. H11-222664 discloses a metal mask with openings, in which the sidewalls of the openings are inclined with respect to the metal mask surfaces such that the openings have an increased area at one of the surfaces facing an evaporation source so that particles from the evaporation source come into the openings with reduced restriction thereby better achieving uniform film formation within the openings.

The aforementioned Japanese Patent Application Laid-Open No. H06-347639 discloses that filter sectors are desired to abut each other unless achromatic areas which do not constitute any filter sectors are intentionally disposed, but does not teach how it can be achieved. Also, the aforementioned Japanese Patent Application Laid-Open No. H11-222664 discloses a method that is anticipated to be good to a certain degree for clearly demarcating a boundary between filter sectors provided that an optimum inclination angle of the sidewalls surely exists and can be obtained somehow, which allows a film to be formed uniform in thickness all the way up to the peripheries of filter sectors. The optimum inclination angle of the sidewalls, however, must be obtained theoretically and experimentally based on various considerations, such as a film material, method and conditions of film formation, a desired film thickness, a metal mask thickness, and the like, and therefore the method disclosed therein cannot be readily applied to fabrication of a color wheel.

SUMMARY OF THE INVENTION

The present invention has been made in light of the above problems, and it is an object of the present invention to provide a method for easily and inexpensively manufacturing a color wheel, in which filter sectors are precisely positioned with respect to each other, and to provide a color wheel which can be fabricated by the manufacturing method, and which is incorporated in a color wheel assembly for an image display apparatus.

In order to achieve the object, according to a first aspect of the present invention, a manufacturing method is provided to fabricate a color wheel which is structured such that a plurality of filter sectors functioning either to selectively transmit or to selectively reflect lights having respective different wavelength bands are formed on both side surfaces of a disk-like substrate made of a light-transmittable material. The method comprises the steps of shaping, on the top and bottom surfaces of the substrate, structures as means for demarcating the filter sectors; forming filters such that two filter sectors adjacent to each other are disposed respectively on the top and bottom surfaces of the substrate; and removing the structures shaped on the top and bottom surfaces of the substrate. Since two filter sectors adjacent to each other are formed respectively on the top and bottom surfaces of the substrate, all the filter sectors can be duly demarcated at one time prior to the process of forming filters. Consequently, the filter sectors can be formed without positioning one filter sector to poorly demarcated peripheries of another filter sector previously formed. Also, with an apparatus enabling simultaneous double-side processing, the number of the processes for forming filters can be reduced.

In the first aspect of the present invention, the step of shaping structures may include a process of preparing first and second masking jigs with openings serving to demarcate the filter sectors and then fixedly setting the first and second masking jigs respectively on the top and bottom surfaces of the substrate, and the step of removing the structures may include a process of taking off the first and second masking jigs from the substrate. Consequently, the filter sectors can be positioned to the openings of the masking jigs which are by far more clearly outlined than filters formed, and therefore can be easily positioned with respect to one another with a high accuracy.

In the first aspect of the present invention, the step of shaping structures may include a process of forming recesses serving to demarcate the filter sectors directly on the top and bottom surfaces of the substrate, and the step of removing the structures may include a process of grinding off portions of the substrate raised relative to the recesses. Consequently, the structures as means for demarcating the filter sectors can be formed directly on the both side surfaces of the substrate beforehand with an accuracy achieved by the process of forming the recesses, and therefore all the filter sectors can be duly demarcated without further positioning procedures once the substrate is provided with the recesses functioning as the structures for demarcating means.

In the first aspect of the present invention, the recesses are formed by at least one of die-forming, bonding, and etching. Consequently, the structures as means for demarcating the filter sectors can be formed directly on the substrate with a high accuracy achieved by a technique used for, for example, forming precision optical elements, and therefore all the filter sectors can be readily positioned with respect to one another with a high accuracy.

In the first aspect of the present invention, the step of forming the filters may include a process of forming dielectric multi-layer films on the top and bottom surfaces of the substrate. Consequently, the filter sectors are constituted by optical interference filters formed of dielectric multi-layer films thereby providing an excellent durability (heat resistance, light stability, and chemical resistance), a high transmittance, and a sharp spectroscopic characteristic.

According to a second aspect of the present invention, in a color wheel which comprises a disk-like substrate made of a light-transmittable material, and a plurality of filter sectors formed on the both side surfaces of the substrate and functioning either to selectively transmit or to selectively reflect lights having respective different wavelength bands, two filter sectors adjacent to each other are disposed respectively on the top and bottom surfaces of the substrate. Since the color wheel is structured such that filter sectors adjacent to each other are disposed on respective different surfaces of the substrate, the color wheel can be fabricated by the manufacturing method according to the first aspect of the present invention, whereby a boundary gap, which is generated between the two adjacent filter sectors, and which prohibits light from contributing to forming an image, can be minimized in its width down to, for example, several μm.

According to the second aspect of the present invention, the color wheel, together with a motor for rotating the color wheel, may compose a color wheel assembly. Since the color wheel assembly incorporates the color wheel in which the width of the boundary gap between the two adjacent filter sectors is minimized, white light can be used very efficiently.

According to the second aspect of the present invention, the color wheel assembly incorporating the color wheel may be employed in an image display apparatus. Since the image display apparatus incorporates the color wheel assembly which allows white light to be utilized very efficiently, a very high-quality image can be displayed.

DESCRIPTION OF THE PREFERRED EMBODIMENTS

Figure 1A:
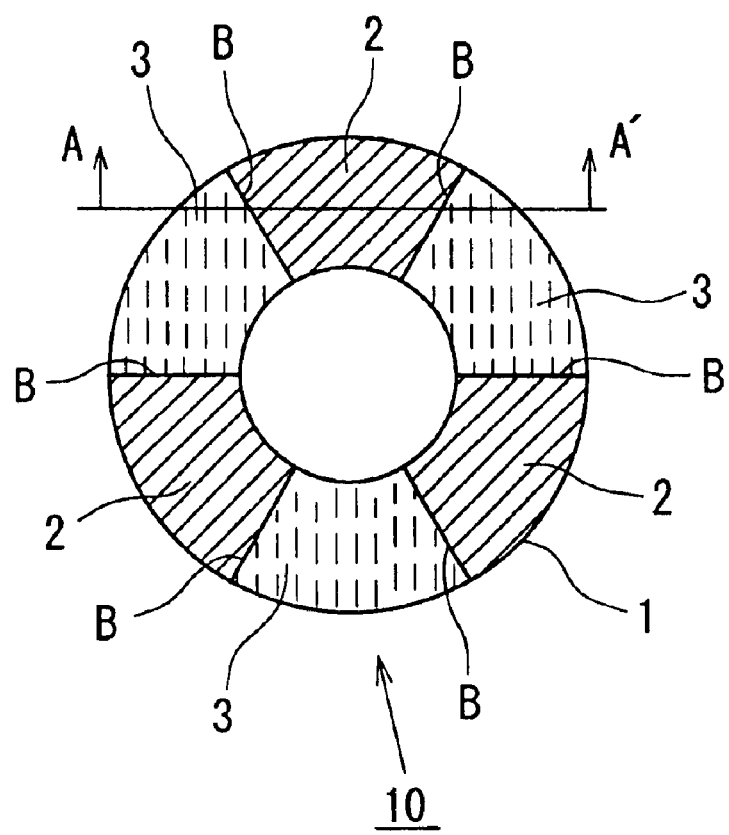
FIG. 1A is a plan view of a bicolor color wheel fabricated by a manufacturing method according to a first embodiment of the present invention.
Figure 1B:
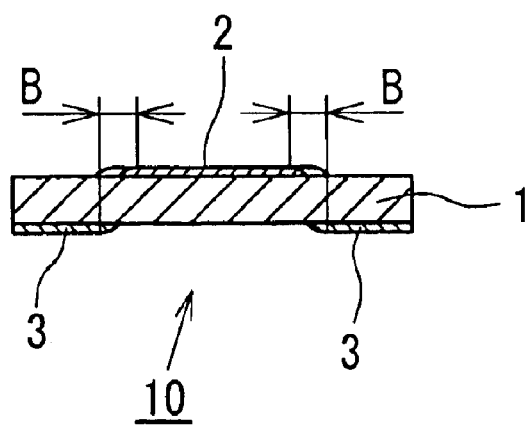
FIG. 1B is a cross-sectional view thereof taken along a line A–A' in FIG. 1A.
Figure 2A:
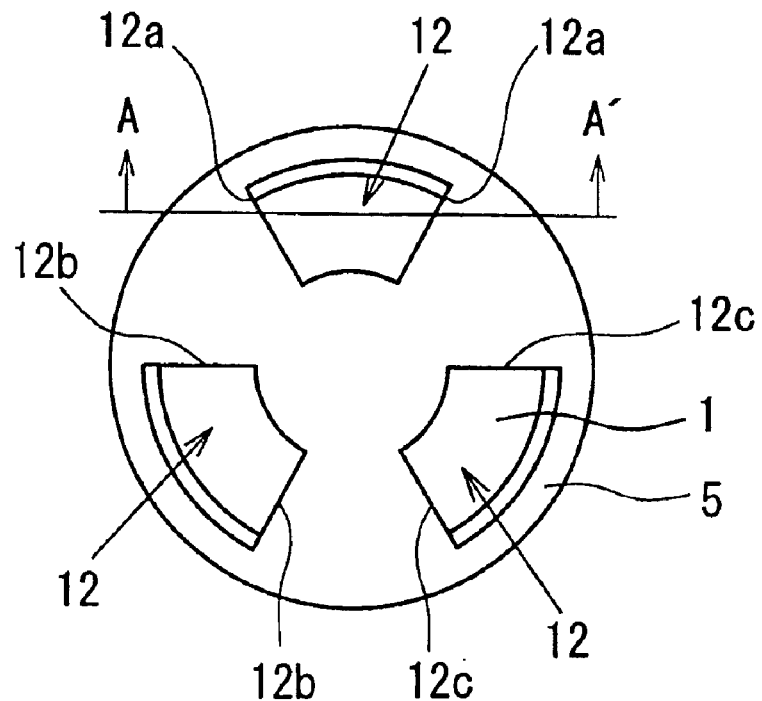
FIG. 2A is a top plan view of the color wheel of FIGS. 1A and 1B under fabrication, showing top and bottom masking jigs set respectively on top and bottom surfaces of a substrate in the manufacturing method according to the first embodiment.
Figure 2B:
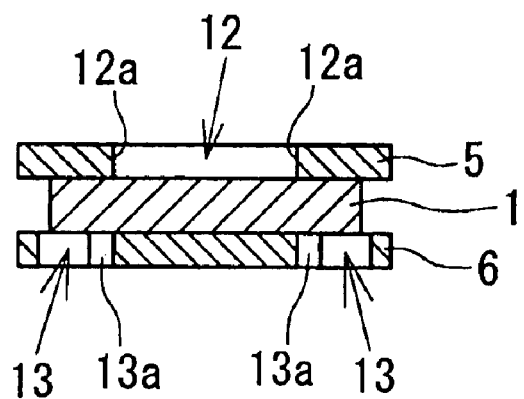
FIG. 2B is a side view thereof.
Figure 2C:
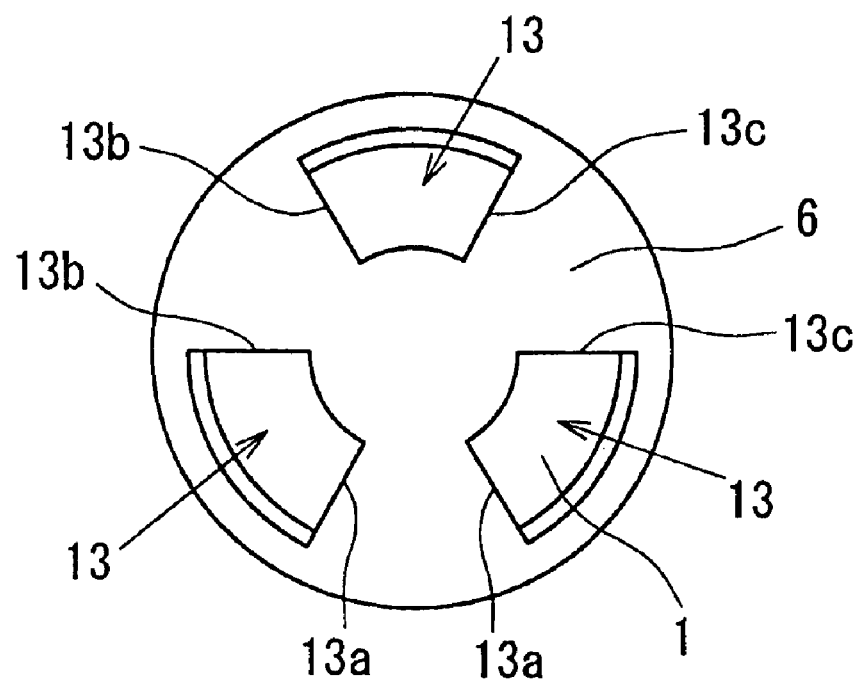
FIG. 2C is a bottom plan view thereof.

The present invention will hereinafter be described with reference to the drawings. A manufacturing method of a color wheel according to a first embodiment of the present invention will be discussed with reference to FIGS. 1A to 3B. FIGS. 1A and 1B show a color wheel 10 fabricated by the manufacturing method according to the first embodiment. The color wheel 10 comprises: a disk-like substrate 1 made of a light-transmittable material, for example, glass, or resin; three filter sectors 2 formed on one surface (hereinafter referred to as "top surface") of the substrate 1; and three filter sectors 3 formed on the other surface (hereinafter referred to as "bottom surface") of the substrate 1. The color wheel 10 is a bicolor color wheel structured such that the filter sectors 2 formed on the top surface are, for example, Y transmitting filters to reflect B light only and to transmit lights having other wavelength bands, and the filter sectors 3 formed on the bottom surface are, for example, M transmitting filters to reflect G light only and to transmit lights having other wavelength bands. Here, the filter sectors 2 and the filter sectors 3 are constituted by a well-known optical interference filter of a dielectric multi-layer film formed by an evaporation method, a sputtering method, or the like. The light-transmittable material for the substrate 1 may preferably be, for example, optical glass such as borosilicic acid glass, or optical plastic such as polymethyl methacrylate, polycarbonate, and polycyclic olefin. Boundaries B each exist only between each filter sector 2 and each filter sector 3 sandwiching the substrate 1 and do not exit between the filter sectors 2 on the top surface or between the filter sectors 3 on the bottom surface.

In the discussion of a color wheel to follow below, each kind of filter sector transmits light having a given wavelength band only thereby performing its filtering function, but the present invention is not limited thereto but includes a color wheel in which each kind of filter sector is adapted to perform its filtering function by reflecting light having a given wavelength band only.

Figure 3A:
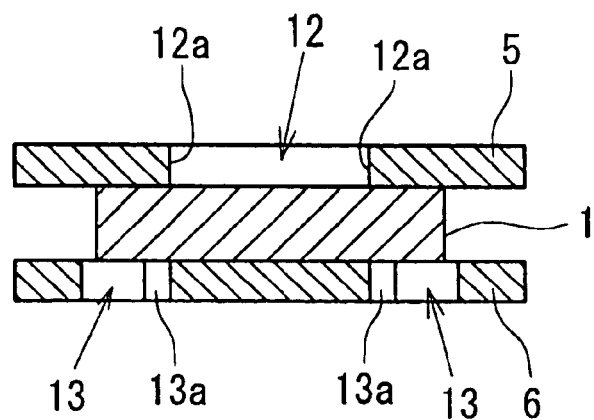
FIGS. 3A to 3C are cross-sectional views of processes of the manufacturing method according to the first embodiment.

Referring now to FIGS. 2A to 2C and 3A to 3C, the manufacturing method according to the first embodiment will be described in detail. The method includes: a process of setting a top masking jig 5 and a bottom masking jig 6 respectively on the top and bottom surfaces of the substrate 1 (refer to FIG. 3A, also FIGS. 2A to 2C); a process of forming respective filters, namely the filter sectors 2 and 3 on the top and bottom surfaces, respectively (refer to FIG. 3B); and a process of taking off the top and bottom masking jigs 5 and 6 from the substrate 1 (refer to FIG. 3C). In the embodiment, the masking jigs 5 and 6 are known metal masks formed of a thin metal plate by an electroforming method, an etching method, a laser machining method, or the like. The top and bottom masking jigs 5 and 6 have respective openings 12 and 13 configured to correspond to the filter sectors 12 and 13, respectively. When the top and bottom masking jigs 5 and 6 are duly set in place, the openings 12 and 13 are positioned so as not to overlap each other at any portions, and sidewalls 12a, 12b and 12c defining radial sides of respective openings 12, and sidewalls 13a, 13b and 13c defining radial sides of respective openings 13 are substantially flush with each other sandwiching the substrate 1, as shown in FIG. 3A.

The aforementioned processes will be described in detail. Referring to FIG. 3A, at the process of setting the top and bottom masking jigs 5 and 6 respectively on the top and bottom surfaces of the substrate 1, the masking jigs 5 and 6 are first guided by a mechanical method, for example, using a positioning pin, and then precisely positioned by viewing microscopically the sidewalls 12a and 13a for flush alignment. Thus, the resultant filter sectors 2 and 3 are demarcated with respect to each other with an accuracy of several $\mu$m achieved by the processing accuracy on the masking jigs 5 and 6.

Figure 3B:
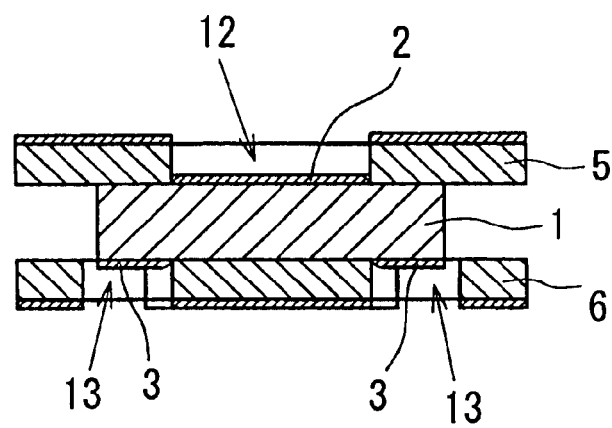
Figure 3C:
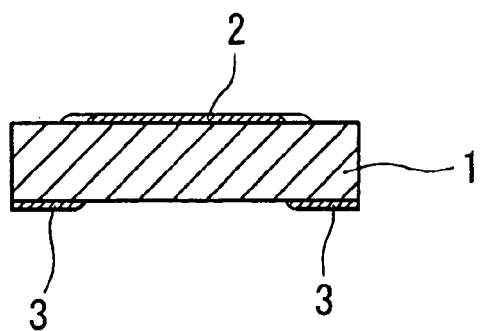

Referring to FIG. 3B, at the process of forming the filter sectors 2 and 3, predetermined optical interference filters of a dielectric multi-layer film are formed by a well-known thin film forming technique, such as an evaporation method, a sputtering method, or the like. Since the filter formation regions for the filter sectors 2 and 3 are demarcated simultaneously in the previous process as described above, the filter sectors 2 and 3 can be totally formed at this one process, thus eliminating the conventionally required processes of exchanging or shifting a masking jig and then positioning the masking jig to the periphery of filter sectors formed earlier. With an apparatus which enables simultaneous film formation on the top and bottom surfaces of the substrate 1, the filter sectors 2 and 3 can be formed at one time. And, referring to FIG. 3C, the masking jigs 5 and 6 are taken off from the substrate 1, and the color wheel 10 shown in FIGS. 1A and 1B is completed.

Figure 4A:
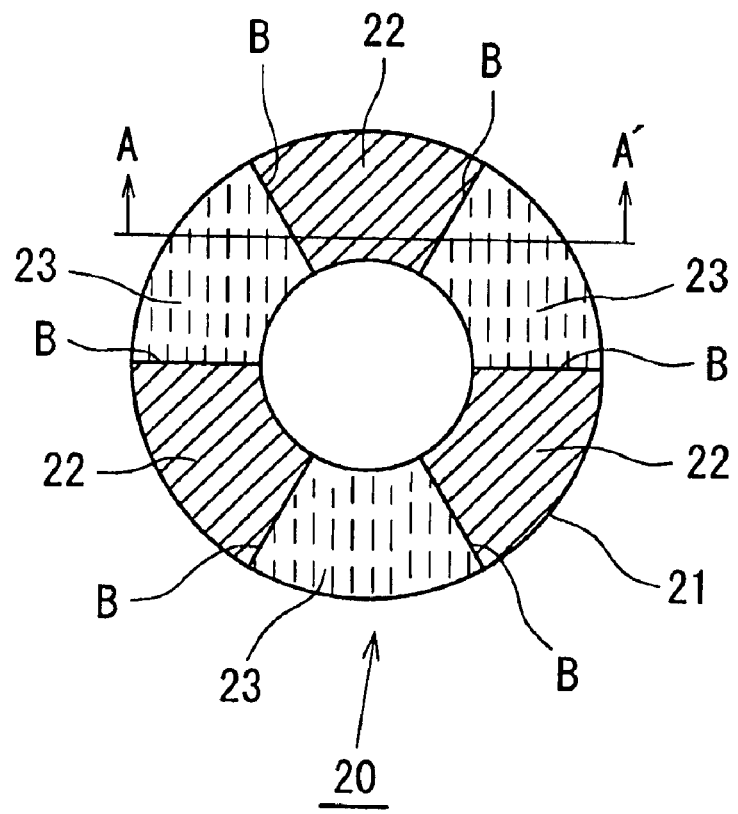
FIG. 4A is a plan view of a bicolor color wheel fabricated by a manufacturing method according to a second embodiment of the present invention.
Figure 4B:
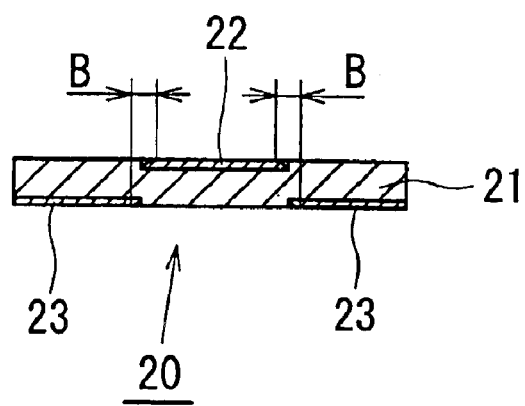
FIG. 4B is a cross-sectional view thereof taken along a line A–A' in FIG. 4A.

A manufacturing method of a color wheel according to a second embodiment of the present invention will now be described with reference to FIGS. 4A to 6C. FIGS. 4A and 4B show a color wheel 20 fabricated by the manufacturing method according to the second embodiment. The color wheel 20 comprises: a disk-like substrate 21 made of a light-transmittable material, for example, glass, or resin; three filter sectors 22 formed on one surface (hereinafter referred to as "top surface") of the substrate 21; and three filter sectors 23 formed on the other surface (hereinafter referred to as "bottom surface") of the substrate 21. The color wheel 20 is a bicolor color wheel structured such that the filter sectors 22 formed on the top surface are, for example, Y transmitting filters to reflect B light only and to transmit lights having other wavelength bands, and the filter sectors 23 formed on the bottom surface are, for example, M transmitting filters to reflect G light only and to transmit lights having other wavelength bands. Here, the filter sectors 22 and the filter sectors 23 are constituted by a well-known optical interference filter of a dielectric multi-layer film formed by an evaporation method, a sputtering method, or the like. The light-transmittable material for the substrate 21 may preferably be, for example, optical glass such as borosilicic acid glass, or optical plastic such as polymethyl methacrylate, polycarbonate, and polycyclic olefin. Like the color wheel 10 fabricated by the manufacturing method according to the first embodiment described above, boundaries B exist only between each filter sector 22 and each filter sector 23 sandwiching the substrate 21 and do not exit between the filter sectors 22 on the top surface or between the filter sectors 23 on the bottom surface. The filter sectors 22 and 23 are formed to be flush respectively with the top and bottom surfaces of the substrate 21 as shown in FIG. 4B.

Referring to FIGS. 5A to 5C and 6A to 6C, the manufacturing method according to the second embodiment will be described in detail. The method includes: a process of forming recesses 32 and 33 corresponding to the filter sectors 22 and 23 respectively on the top and bottom surfaces of the substrate 21 (refer to FIG. 6A, also FIGS. 5A to 5C); a process of forming respective filters, namely the filter sectors 22 and 23 on the top and bottom surfaces, respectively (refer to FIG. 6B); and a process of grinding off portions 34 of the substrate 21 raised relative to the filter sectors 22 and 23 formed respectively at the recesses 32 and 33 (refer to FIG. 6C).

Figure 5A:
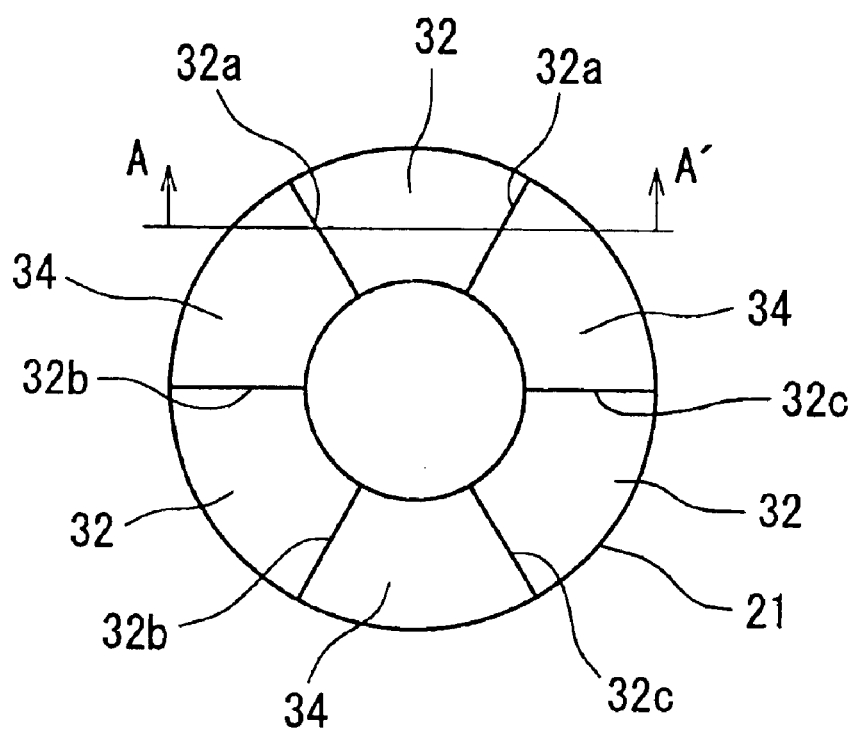
FIG. 5A is a top plan view of the color wheel of FIGS. 4A and 4B under fabrication, showing recesses formed at top and bottom surfaces of a substrate in the manufacturing method according to the second embodiment.
Figure 5B:
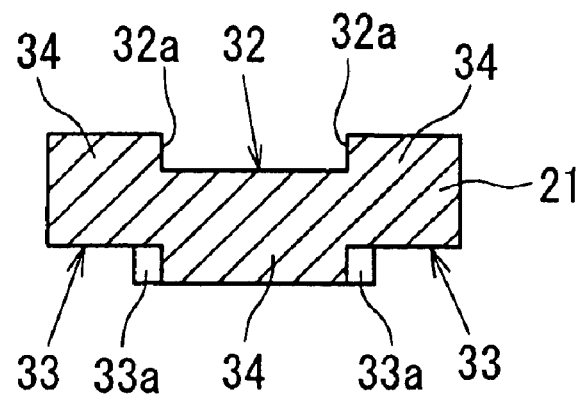
FIG. 5B is a side view thereof.
Figure 5C:
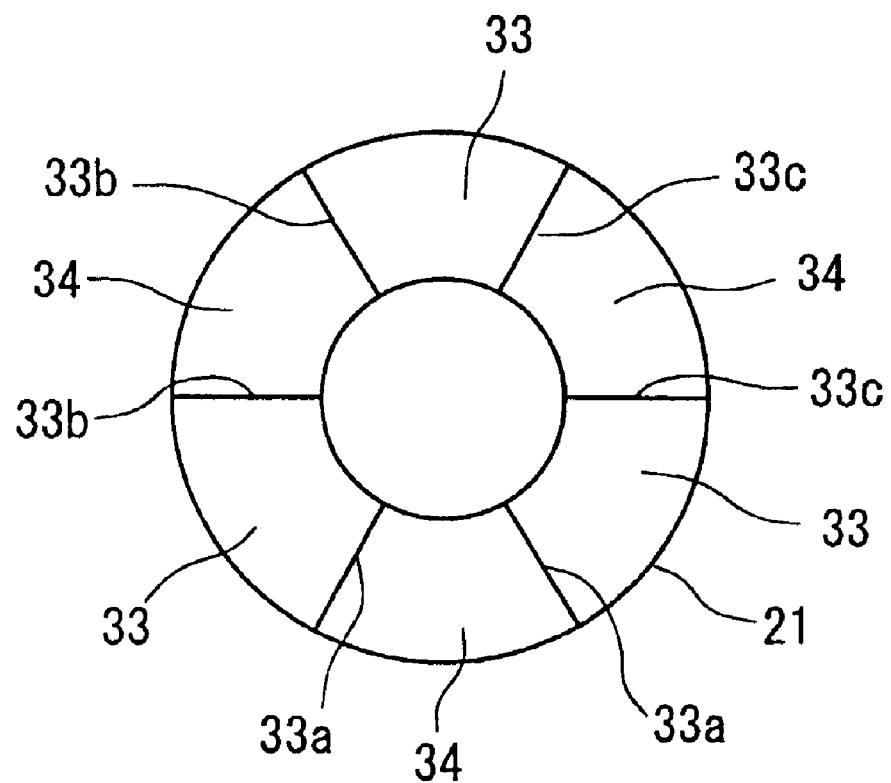
FIG. 5C is a bottom plan view thereof.

Referring to FIGS. 5A to 5C, the recesses 32 and 33 corresponding to the filter sectors 22 and 23 are formed directly at the top and bottom surfaces of the substrate 21, whereby the portions 34 of the substrate 21 remaining intact are formed to be raised relative to the recesses 32 and 33. The recesses 32 and 33 are positioned so as not to overlap each other at any portions, and sidewalls 32a, 32b and 32c defining radial sides of respective recesses 32, and sidewalls 33a, 33b and 33c defining radial sides of respective recesses 33 are substantially flush with each other sandwiching the substrate 21, as shown in FIG. 5B. The height of the sidewalls 22a to 22c and 32a to 32c, namely the depth of the recesses 32 and 33 is preferably set at 2 to 10 times the thickness (usually 1 to 4 $\mu$m) of the filter sectors 22 and 23 formed at the recesses 32 and 33, respectively.

The recesses 32 and 33 may be formed at the substrate 21 by using a glass or resin processing technique with a high accuracy, that is employed for fabricating an optical element, such as a lens, a diffraction grating, and the like, or for fabricating a substrate of an optical information recording medium, such as a CD, a DVD, and the like. Specifically, the recesses 32 and 33 can be formed, in case of the substrate 21 made of a glass material, by die-forming (e.g., hot press-molding), adhesive lamination, etching or the like, and in case of the substrate 21 made of a resin material, by die-forming (e.g., casting, injection-molding, and compression-molding), and also adhesive lamination, or etching mentioned above for the glass material. The aforementioned adhesive lamination includes adhesion by fusing a material as well as by bonding or gluing. The techniques mentioned above may be selectively combined as required. Thus, the recesses 32 and 33 can be formed directly at the substrate 21 with an accuracy of several $\mu$m.

When etching is used for forming the recesses 32 and 33, patterning by, for example, photo processing is required. The photo processing comprises a series of steps consisting of applying, exposing and developing photo resist, forming film, and removing the photo resist, and the series of steps must be performed repeatedly for each kind of filter sectors in the conventional methods. At the etching process in the method of the present embodiment, the series of steps are performed at most two times in case of per-side processing, and only one time in case of double-side simultaneous processing, regardless of the number of kinds of filter sectors. This contributes to reducing the processing time while maintaining a high accuracy, especially when fabricating a tricolor color wheel.

Figure 6A:
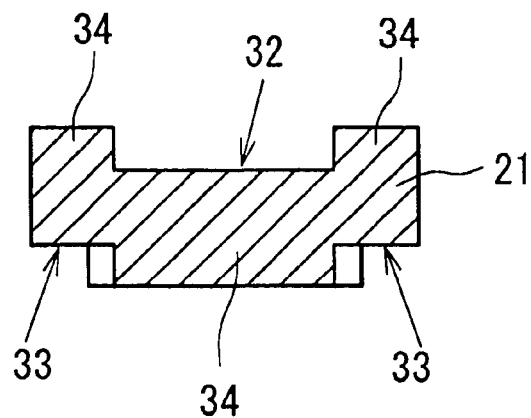
FIGS. 6A to 6C are cross-sectional views showing processes of the manufacturing method according to the second embodiment.
Figure 6B:
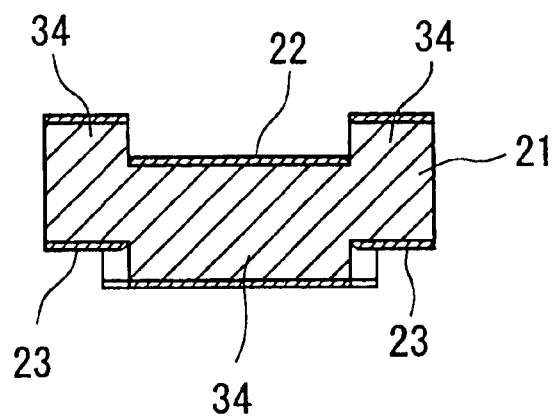
Figure 6C:
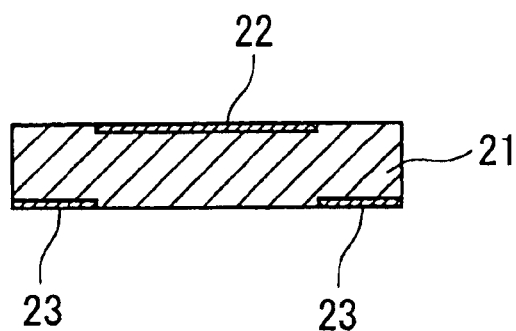

The aforementioned processes included in the manufacturing method according to the second embodiment will be described in detail. Referring to FIG. 6A, the recesses 32 and 33, which correspond respectively to the filter sectors 22 and 23, are demarcated with the aforementioned high accuracy and formed directly at the substrate 21. Referring then to FIG. 6B, the filter sectors 22 and 23, which are optical interference filters of a dielectric multi-layer film, are formed by a well-known film forming method, such as an evaporation method, or a sputtering method respectively at the recesses 32 and 33 on the top and bottom surfaces. Since the recesses 32 and 33 corresponding to the filter sectors 22 and 23 are demarcated and formed directly the substrate 21 at the previous process as described above, filter sectors of all kinds (two kinds 22 and 23 in the embodiment) can be totally formed without requirement of changing or shifting a metal mask after formation of filter sectors of one kind (e.g., filter sectors 22) and then positioning a new metal mask to the peripheries of the filter sectors formed earlier (e.g., filter sectors 22) for the purpose of forming filter sectors of the other kind (e.g., filter sectors 23). When a film forming apparatus enabling double-side simultaneous processing is used, the filter sectors 22 and 23 can be formed simultaneously. And referring now to FIG. 6C, the portions 34 (refer to FIG. 6B) of the substrate 21 raised relative to the filter sectors 22 and 23 are ground off to be flush with the filter sectors 22 and 23 by a general grinding apparatus which is used for processing, for example, an optical element, and the color wheel 20 shown in FIGS. 4A and 4B is completed.

A manufacturing method of a color wheel according to a third embodiment of the present invention will be described with reference to FIGS. 7A and 7B. In describing the third embodiment, a focus will be put on what is unique thereto.

Figure 7A:
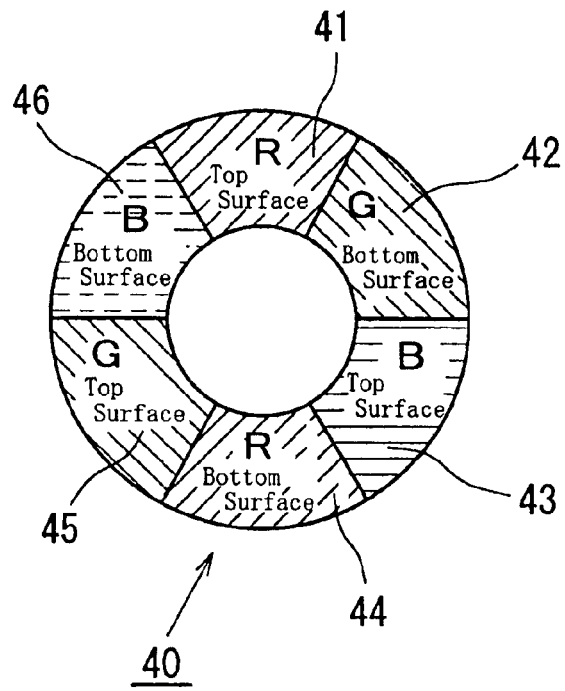
FIG. 7A is a plan view of a tricolor color wheel fabricated by a manufacturing method according to a third embodiment of the present invention.

FIG. 7A shows a color wheel 40 fabricated by the manufacturing method according to the third embodiment. The color wheel 40 is a tricolor color wheel structured such that a disk-like substrate has three filter sectors 41, 43 and 45 formed on its top surface and has three filter sectors 42, 44 and 46 formed on its bottom surface. On the top surface of the substrate, the filter sector 41 is an R transmitting filter to transmit R light only, the filter sector 43 is a B transmitting filter to transmit B light only, and the filter sector 45 is a G transmitting filter to transmit G light only, and on the bottom surface, the filter sector 42 is a G transmitting filter, the filter 44 is an R transmitting filter, and the filter sector 46 is a B transmitting filter.

On the top surface of the substrate, a top metal mask is set which has openings configured to correspond respectively to the filter sectors 41, 43 and 45 while on the bottom surface, a bottom metal mask is set which has openings configured to correspond respectively to the filter sectors 42, 44 and 46. The filter sectors 41 to 46 formed on the top and bottom surfaces are duly positioned with respect to one another by means of the top and bottom metal masks with an accuracy of several μm in the same way as in the first embodiment described above. In the present embodiment, the color wheel 40 has three kinds of filters formed on each side surface of the substrate. Specifically, the R transmitting filter (41/44), the B transmitting filter (43/46), and the G transmitting filter (45/42) are formed on the top/bottom surface of the substrate, and since these three kinds of filters are to be formed singly in turn, the openings of the top masking jig for the B and G transmitting filters (43 and 45) are covered up by something like an auxiliary masking jig when forming the R transmitting filter (41), the openings for the R and G transmitting films (41 and 45) are covered up when forming the B transmitting filter (43), and the openings for the R and B transmitting filters (41 and 43) are covered up when forming the G transmitting filter (45). On the bottom surface, the same procedure is performed. Thus, six times of film forming processes are performed when the procedure takes place separately on the top and bottom surfaces of the substrate, and three times of film forming processes are performed when the procedure takes place simultaneously on the top and bottom surfaces. The aforementioned auxiliary masking jig is only for covering up the openings of the metal mask and has no effect on the accuracy of demarcating the filter sectors and of positioning one filter sector with another.

Figure 7B:
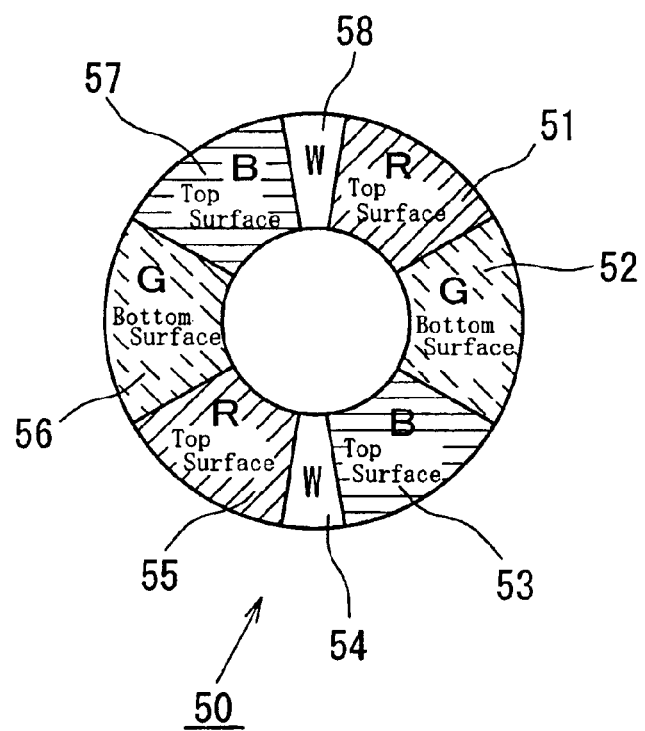
FIG. 7B is a plan view of another tricolor color wheel fabricated by the manufacturing method according to the second embodiment.

FIG. 7B shows another tricolor color wheel 50 fabricated by the manufacturing method according to the third embodiment. The color wheel 50 has four filter sectors 51, 53, 55 and 57 formed on a top surface of a substrate, has two filter sectors 52 and 56 formed on a bottom surface of the substrate, and includes two achromatic sectors 54 and 58 for the purpose of enhancing the brightness of an entire image in, for example, a projection-type image display apparatus. The four filter sectors formed on the top surface of the substrate are two R transmitting filters (51, 55) and two B transmitting filters (53, 57), and the two filter sectors formed on the bottom surface are two G transmitting filters (52, 56). Thus, since the tricolor color wheel 50 has three kinds of filter sectors such that two kinds thereof are formed on the top surface of the substrate and one kind thereof are formed on the bottom surfaces, only a total of three times of film forming processes are required even when the filter sectors are formed separately on the top and bottom surfaces of the substrate.

Now, a description will be made on a color wheel assembly which incorporates a color wheel fabricated according to one of the above-described manufacturing methods of the present invention.

Figure 8A:
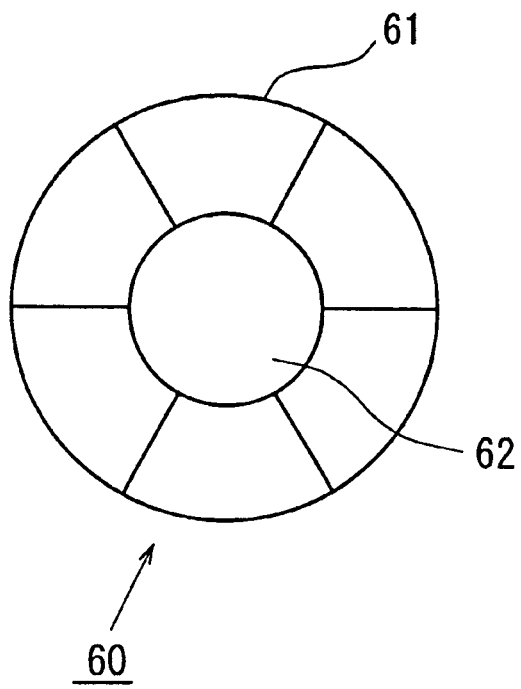
FIG. 8A is a front view of a color wheel assembly incorporating a color wheel fabricated by one of the manufacturing methods of the present invention.
Figure 8B:
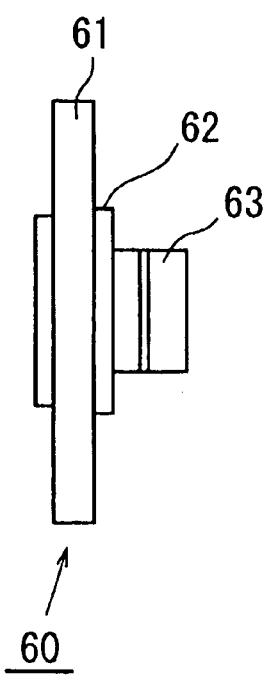
FIG. 8B is a side view thereof.

Referring to FIGS. 8A and 8B, a color wheel assembly 60 comprises a color wheel 61, a motor 63 to rotate the color wheel 61, and a hub 62 for fixedly attaching the color wheel 61 onto the motor 63 such that the inner circumference of the color wheel 61 is fixed to the hub 62 by means of, for example, adhesive, and that the hub 62 and the motor 63 are fixedly attached to each other adhesively, or mechanically, e.g., screwing. The color wheel 61 may alternatively be fixed directly to the motor 61 without the hub 62, for example, by sharing a common rotary shaft with the motor 61. The color wheel 61 is a bicolor or tricolor color wheel having filter sectors formed on both surfaces of a substrate such that filter sectors are not continuously adjacent to each other on one same surface as described above in the first to third embodiments.

Figure 9A:
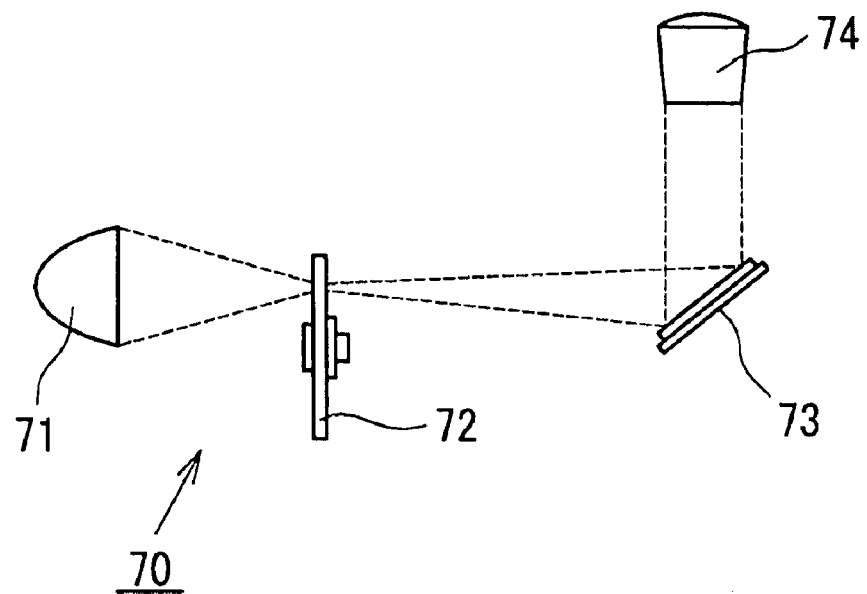
FIG. 9A is a construction view of an image display apparatus including a tricolor color wheel fabricated by one of the manufacturing method according to the present invention.

Further, a discussion will be made on an image display apparatus which includes a color wheel assembly incorporating a color wheel fabricated according to one of the manufacturing methods of the present invention. Referring first to FIG. 9A, an image display apparatus 70 comprises: a white light source 71, such as a metal halide lamp; a color wheel assembly 72; a reflection-type light valve element 73, such as a digital micro mirror device; and a projection lens system 74. In the image display apparatus 70, the color wheel assembly 72 incorporates a tricolor wheel which is fabricated according to one of the above-described manufacturing methods of the present invention. White light emitted from the white light source 71 is dispersed by the color wheel assembly 72 sequentially into, for example, R light, G light and B light, impinges on the light valve element 73 and is thereby modulated sequentially into R, G and B images, which are then sequentially projected by the projection lens system 74 to be composed into a full color image.

Figure 9B:
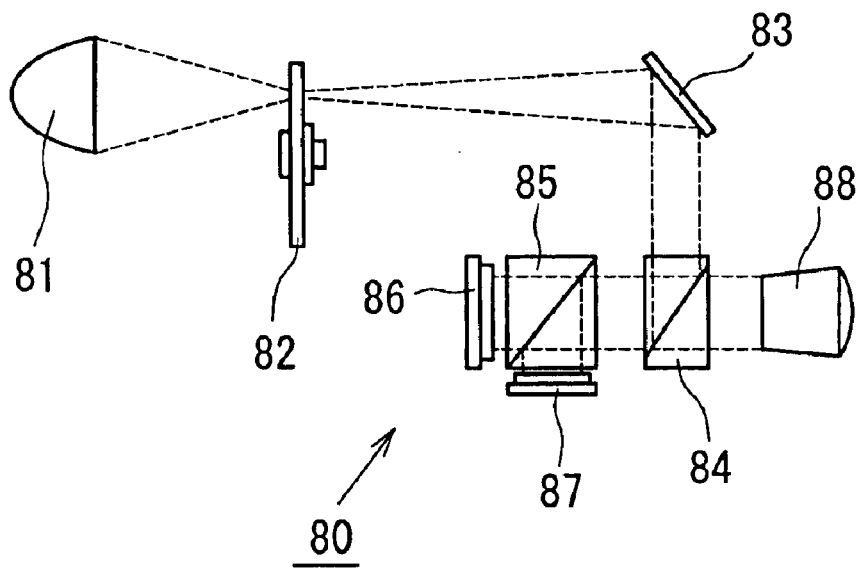
FIG. 9B is a construction view of an image display apparatus including a bicolor color wheel fabricated by one of the manufacturing method according to the present invention.
Figure 10A:
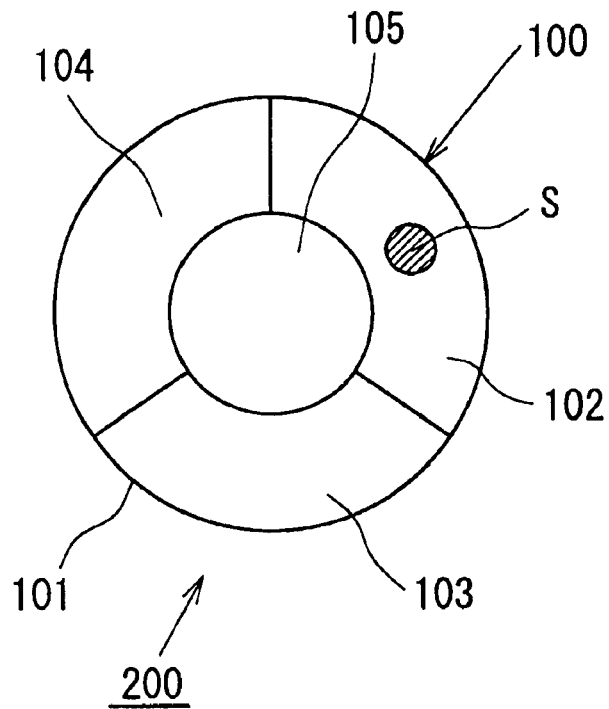
FIG. 10A is a front view of a typical color wheel assembly using a color wheel.
Figure 10B:
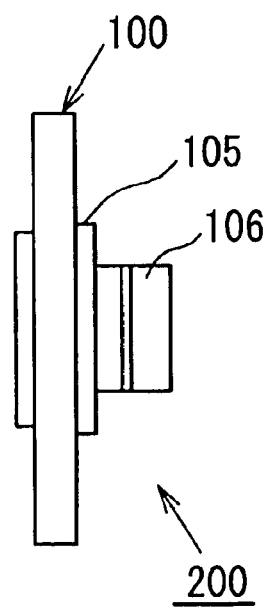
FIG. 10B is a side view thereof.
Figure 11A:
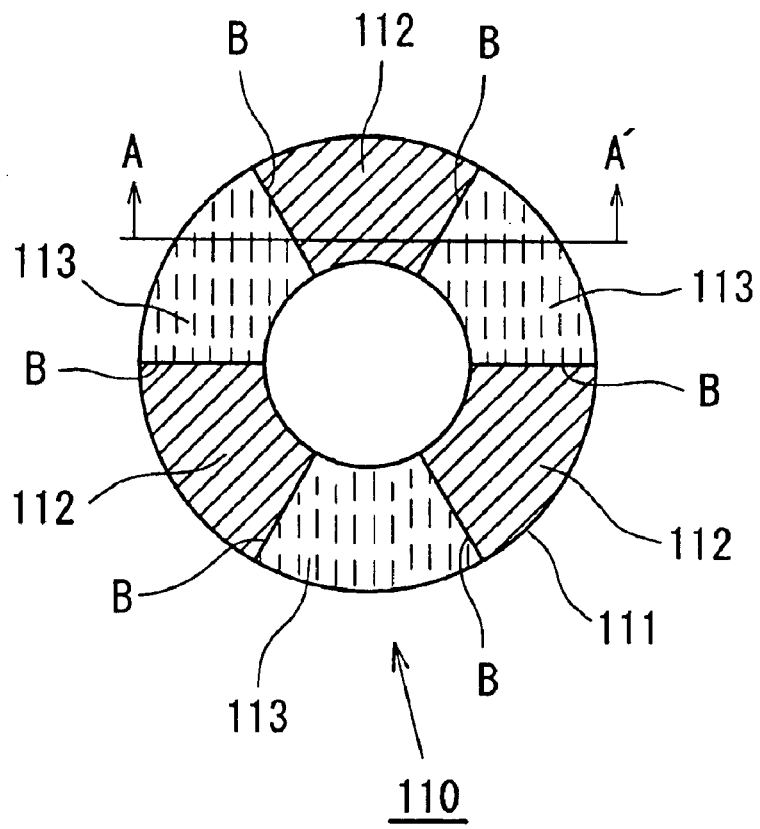
FIG. 11A is a plan view of a conventional color wheel.
Figure 11B:
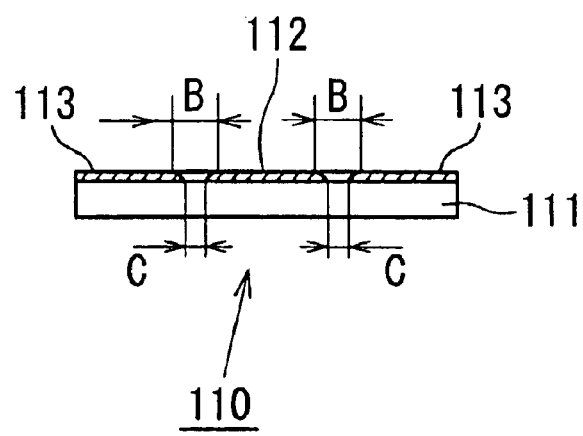
FIG. 11B is a side view thereof.
Figure 12A:
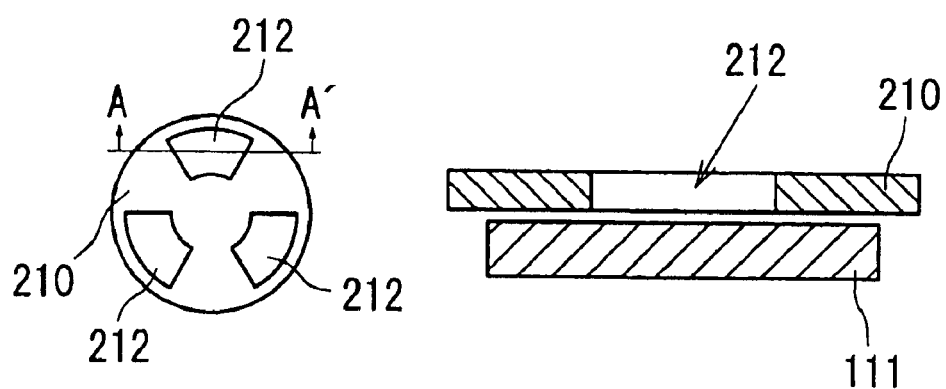
FIGS. 12A to 12D are plan and cross-sectional views showing processes of a conventional manufacturing method of a color wheel.
Figure 12B:
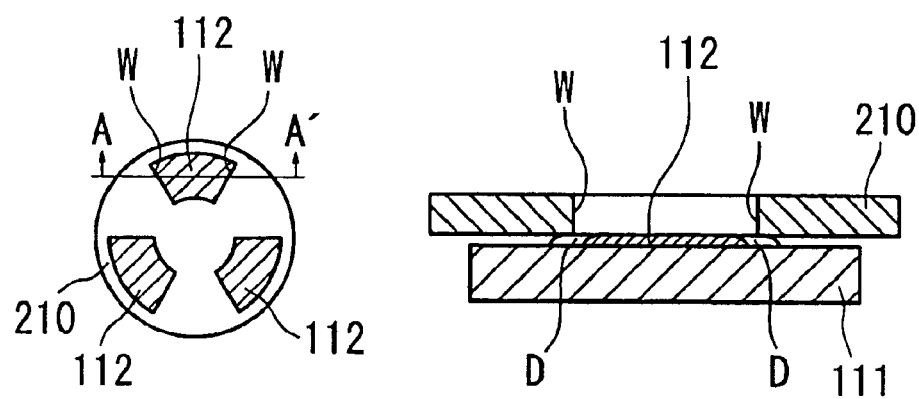
Figure 12C:
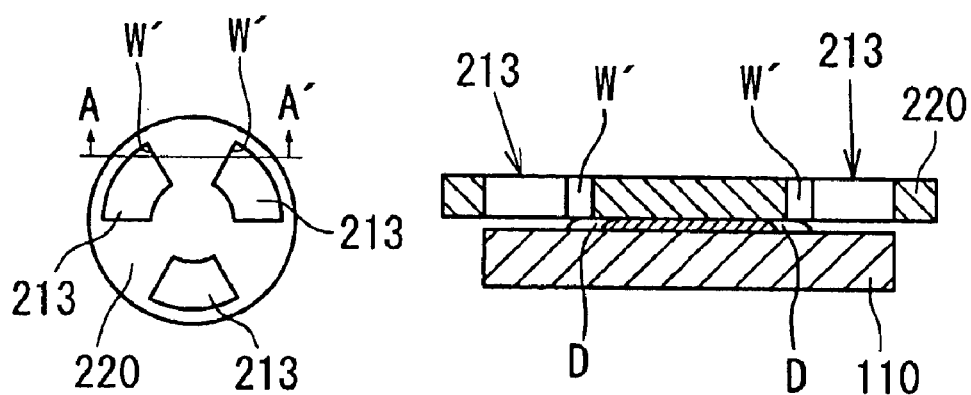
Figure 12D:
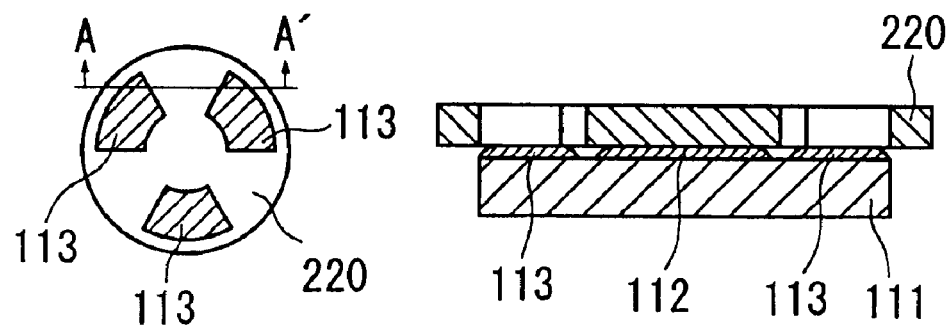

Referring now to FIG. 9B, an image display apparatus 80 comprises: a white light source 81, such as a metal halide lamp; a color wheel assembly 82; a mirror 83; a total reflection prism 84; a dichroic prism 85; reflection-type light valve elements 86, 87, such as digital micro mirror devices; and a projection lens system 88. In the image display apparatus 80, the color wheel assembly 82 incorporates a bicolor color wheel which is fabricated according to one of the above-described manufacturing methods of the present invention. White light emitted from the white light source 81 is dispersed by the color wheel assembly 82 sequentially into, for example, yellow (Y) light and magenta (M) light which have their travel direction changed by the mirror 83 and the total reflection prism 84, and impinge on the dichroic prism 85 which is adapted to transmit, for example, R light only, and to reflect light having other wavelength bands. The Y light impinging on the dichroic prism 85 is dispersed thereby into R and G lights which impinge on the light valve element 86 and then the light valve element 87 while the M light impinging on the dichroic prism 85 is dispersed into R and B lights which impinge on the light valve element 86 and then the light valve element 87. The light valve element 86 modulates the R light into an R image, and the light valve element 87 modulates the G and B lights into G and B images, respectively. The R and G images, and the R and B images impinge again on the dichroic prism 85 to be composed thereby into a Y image, and an M image, respectively, and the Y and M images pass through the total reflection prism 84 and are sequentially projected by the projection lens system 88 to be composed into a full color image.

It is evident that those skilled in the art may now make numerous modifications and variations without departing from the inventive concepts. For example, in the aforementioned image display apparatuses 70 and 80, respective light valve elements 73, and 86 and 87 are of reflection type, but may alternatively be of transmission type, such as liquid crystal light valves. Also, it is obvious that any optical systems or control systems can be optionally employed in the image display apparatuses 70, 80. Consequently, it is to be understood that the present invention is by no means limited to the specific embodiments described above but encompasses all changes and modifications which will become possible within the scope of the appended claims.

What is claimed is:

1. A method for manufacturing a color wheel which is structured such that plural kinds of filter sectors functioning either to selectively transmit or to selectively reflect lights having respective different wavelength bands are formed on both side surfaces of a disk-like substrate made of a light-transmittable material, the method comprising the steps of:

shaping, on top and bottom surfaces of the substrate, structures as means for demarcating the filter sectors;

forming filters such that two filter sectors adjacent to each other are disposed respectively on the top and bottom surfaces of the substrate; and removing the structures shaped on the top and bottom surfaces of the substrate.

2. A method for manufacturing a color wheel according to claim 1, wherein the step of shaping structures includes a process of preparing first and second masking jigs with openings serving to demarcate the filter sectors and then fixedly setting the first and second masking jigs respectively on the top and bottom surfaces of the substrate, and wherein the step of removing the structures includes a process of taking off the first and second masking jigs from the substrate.

3. A method for manufacturing a color wheel according to claim 1, wherein the step of shaping structures includes a process of forming recesses serving to demarcate the filter sectors directly on the top and bottom surfaces of the substrate, and wherein the step of removing the structures includes a process of grinding off portions of the substrate raised relative to the recesses.

4. A method for manufacturing a color wheel according to claim 3, wherein the recesses are formed by at least one of die-forming, bonding, and etching.

5. A method for manufacturing a color wheel according to claim 1, wherein the step of forming filters includes a process of forming dielectric multi-layer films on the top and bottom surfaces of the substrate.

6. A color wheel comprising:

a disk-like substrate made of a light-transmittable material; and a plurality of filter sectors formed on both side surfaces of the substrate, and functioning either to selectively transmit or to selectively reflect lights having respective different wavelength bands, wherein two filter sectors adjacent to each other are disposed respectively on top and bottom surfaces of the substrate.

7. A color wheel according to claim 6, wherein the color wheel, together with a motor for rotating the color wheel, composes a color wheel assembly.

8. A color wheel according to claim 7, wherein the color wheel assembly incorporating the color wheel is employed in an image display apparatus.

9. A method for manufacturing a color wheel according to claim 2, wherein the step of forming filters includes a process of forming dielectric multi-layer films on the top and bottom surfaces of the substrate.

10. A method for manufacturing a color wheel according to claim 3, wherein the step of forming filters includes a process of forming dielectric multi-layer films on the top and bottom surfaces of the substrate.

11. A method for manufacturing a color wheel according to claim 4, wherein the step of forming filters includes a process of forming dielectric multi-layer films on the top and bottom surfaces of the substrate.

* * * * *

UNITED STATES PATENT AND TRADEMARK OFFICE
CERTIFICATE OF CORRECTION

PATENT NO. : 6,876,505 B2  
APPLICATION NO. : 10/851186  
DATED : April 5, 2005  
INVENTOR(S) : Shinichi Niwa Page 1 of 1

It is certified that error appears in the above-identified patent and that said Letters Patent is hereby corrected as shown below:

Column 11, line 60, in claim 1, "deniarcating" should read --demarcating--.

Signed and Sealed this

Tenth Day of June, 2008

JON W. DUDAS  
*Director of the United States Patent and Trademark Office*